United States Patent [19]
Cocca

[11] Patent Number: 5,387,955
[45] Date of Patent: Feb. 7, 1995

[54] STILL CAMERA WITH REMOTE AUDIO RECORDING UNIT

[75] Inventor: J. David Cocca, Pittsford, N.Y.

[73] Assignee: Eastman Kodak Company, Rochester, N.Y.

[21] Appl. No.: 110,659

[22] Filed: Aug. 19, 1993

[51] Int. Cl.6 .............. G03B 29/00; G03B 15/03; G03B 17/24
[52] U.S. Cl. .............. 354/76; 354/131; 354/106
[58] Field of Search .............. 354/75, 76, 131, 266, 354/106; 358/906, 909.1

[56] References Cited

U.S. PATENT DOCUMENTS

| | | | |
|---|---|---|---|
| 4,531,161 | 7/1985 | Murakoshi | 358/906 X |
| 4,807,051 | 2/1989 | Ogura | 358/335 |
| 4,905,029 | 2/1990 | Kelley | 354/76 |
| 4,937,604 | 6/1990 | Yoshida et al. | 354/131 X |
| 4,983,996 | 1/1991 | Kinoshita | 354/76 |
| 5,012,335 | 4/1991 | Cohodar | 354/81 X |
| 5,014,136 | 5/1991 | Sakai et al. | 358/906 X |
| 5,032,918 | 7/1991 | Ota et al. | 358/909 X |
| 5,036,344 | 7/1991 | Inoue et al. | 354/106 |
| 5,062,010 | 10/1991 | Saito | 358/909 X |
| 5,099,262 | 3/1992 | Tanaka et al. | 354/106 |
| 5,260,795 | 11/1993 | Sakai et al. | 358/906 X |

FOREIGN PATENT DOCUMENTS 2-297535 12/1990 Japan .

Primary Examiner—Michael L. Gellner
Assistant Examiner—Jae N. Noh
Attorney, Agent, or Firm—Marc A. Rossi

[57] ABSTRACT

A camera system includes a main camera body having a main camera processor coupled to a main body operator interface, a recording head drive circuit and wireless communication receiver, wherein the recording head drive circuit is coupled to a recording head. A remote control unit is also provided that includes a processor unit coupled to an audio record/playback circuit, a remote operator interface and a wireless communication transmitter, wherein the audio record circuit is coupled to a microphone. In operation, the processor unit of the remote control unit controls the record/playback circuit to record an audio segment of a selected duration based on control signals received from the operator interface. The processor unit transmits sound ID data corresponding to the recorded audio segment to the main camera control processor via the wireless communication transmitter and receiver, and the main camera control processor controls the operation of the recording head drive circuit to record the sound ID data on a recording strip located on a photographic film.

9 Claims, 3 Drawing Sheets

5,387,955

STILL CAMERA WITH REMOTE AUDIO RECORDING UNIT

FIELD OF THE INVENTION

The invention relates generally to photographic still cameras including a sound or audio recording feature. More specifically, the invention relates to a photographic still camera having a remote audio recording unit that records sound associated with a still picture captured by the camera.

BACKGROUND

Image information systems have recently been introduced in which photographic film images are scanned and stored in digital form on optical compact storage discs (CD's) for subsequent reproduction and display. The optical storage discs can be utilized to store audio information as well as image information. It is therefore desirable to provide a system in which audio information corresponding to the photographic film image is recorded when the photographic image is exposed, so that the photographic film image and the recorded audio information can subsequently be stored together on the storage disc.

One approach to recording audio information related to a photographic image would be to provide a camera with a sound recording system that records the audio information on an audio storage medium. The sound storage medium could take the form of a magnetic tape, a magnetic information storage disc, or a semiconductor memory that can be detached from the camera and sent with a film roll to a processing facility. The processing facility would then develop the film image, scan the film image to create digitized image data, and store the digitized image data on the storage disc. The audio information contained on the sound storage medium corresponding to the film roll would also be recorded onto the storage disc.

A common problem associated with the use of a separate medium is the requirement of correlating the recorded audio with the correct image during the process of recording the audio and image information on the CD. The invention is directed to providing a camera system that overcomes this correlation problem.

SUMMARY OF THE INVENTION

The invention provides a camera system that includes a main camera body having a main camera processor coupled to a main body operator interface, a recording head drive circuit, and a wireless communication receiver, wherein the recording head drive circuit is coupled to a recording head. A remote control unit is also provided that includes a processor unit coupled to an audio record/playback circuit, a remote operator interface, and a wireless communication transmitter, wherein the audio record circuit is coupled to a microphone. In operation, the processor unit of the remote control unit controls the record/playback circuit to record an audio segment of a selected duration based on control signals received from the remote operator interface. The processor unit transmits sound ID data corresponding to the recorded audio segment to the main camera control processor via the wireless communication transmitter and receiver, and the main camera control processor controls the operation of the recording head drive circuit to record the sound ID data on a recording strip located on a photographic film. The sound ID data recorded on the photographic film is used by a workstation to correlate an image on the photographic film with a corresponding audio segment recorded by the remote control unit, thereby overcoming the problem of properly correlating image and audio data. The main camera body is also preferably equipped with a wireless transmitter and the remote control unit is also equipped with a wireless receiver, such that control signals can be sent from the main camera body to the remote control unit to record the audio segments.

BRIEF DESCRIPTION OF THE DRAWINGS

With the above as background, reference should now be made to the following detailed description of the preferred embodiment of the invention and the accompanying drawings, wherein.

DETAILED DESCRIPTION OF THE PREFERRED EMBODIMENT

Figure 1:
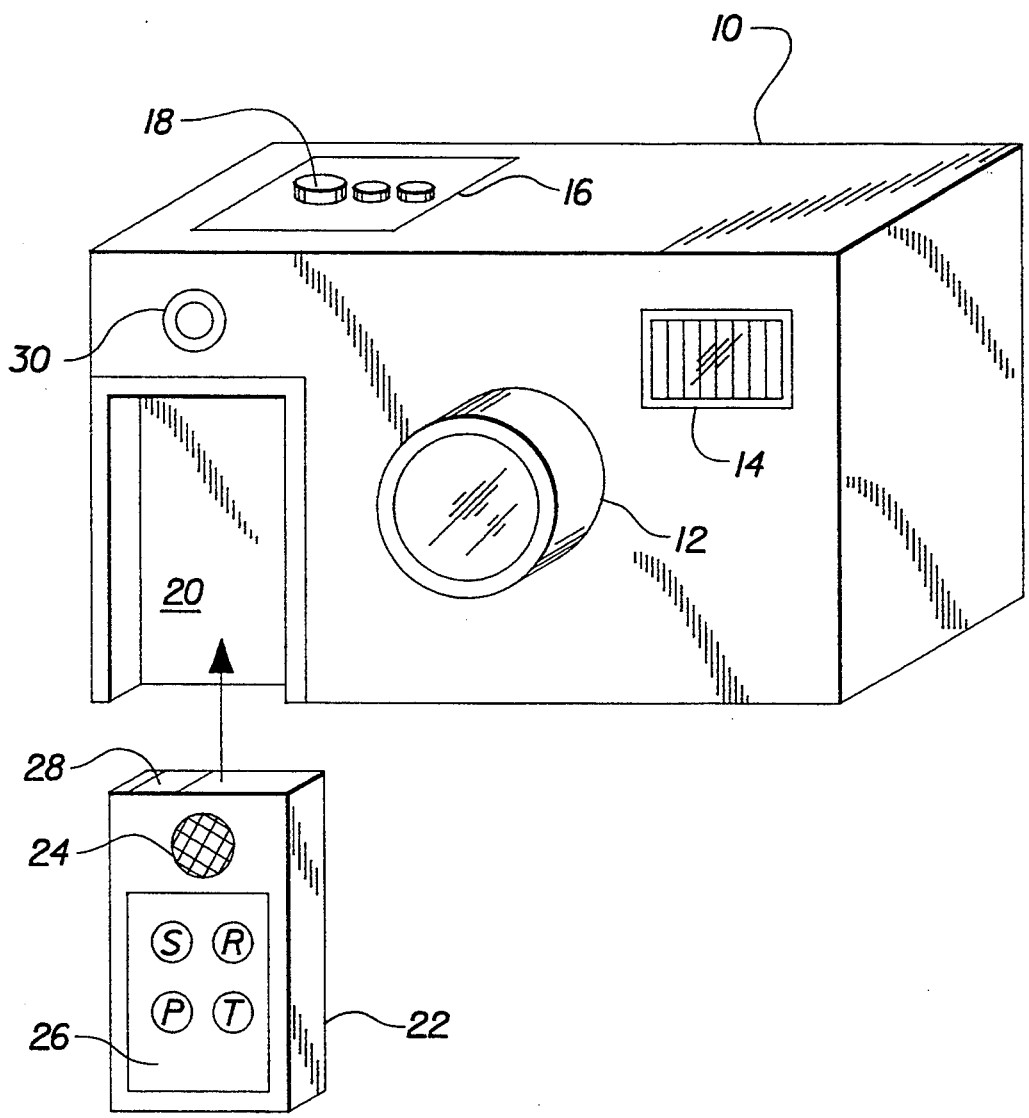
FIG. 1 is a front perspective view of a camera incorporating the invention.

A camera system incorporating the present invention is illustrated in FIG. 1. A main camera body 10 includes a conventional lens assembly 12, a conventional flash unit 14, and a main body operator interface 16 incorporating a shutter button 18 as well as other operator controls. In addition, the main camera body 10 is provided with a slot 20 which is configured to receive a remote control unit 22. The slot 20 and the remote control unit 22 include electrical contacts (not shown) that mate with one another when the remote control unit 22 is placed in the slot 20. The remote control unit includes a microphone 24, a remote operator interface 26, and an infrared (IR) transmitter 28 that communicates with an IR receiver 30 located in the main camera body 10.

Figure 2:
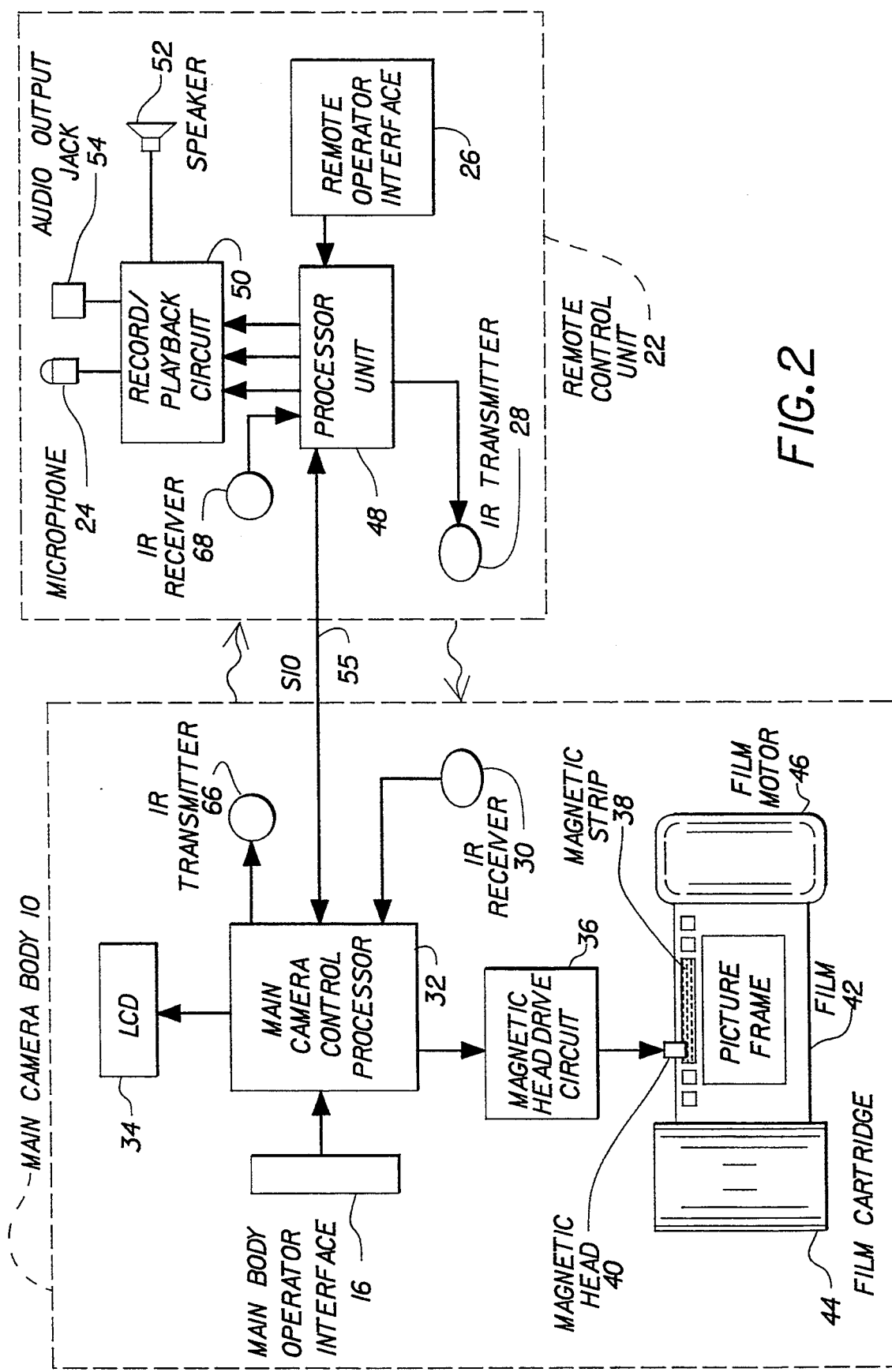
FIG. 2 is an electrical schematic block diagram of the main camera body and remote control unit of the camera illustrated in FIG. 1.

Electrical schematic block diagrams of the main camera body 10 and the remote control unit 22 are illustrated in FIG. 2. The IR receiver 30 and the main body operator interface 16 are coupled to a main camera control processor 32 that controls the overall operation of the camera including a shutter mechanism which is not shown. The main camera control processor 32 is also coupled to a liquid crystal display (LCD) 34, which is preferably located on the back or top of the camera body 10, that is used to convey messages to the operator, and to a magnetic head drive circuit 36. The magnetic head drive circuit 36 is coupled to a magnetic head 38, which is used to record information on a magnetic strip 40 located adjacent to a picture frame area of a photographic film 42 loaded in the main camera body 10. It should be noted that while the illustrated embodiment utilizes magnetic recording, the invention is not limited to the use of a magnetic head drive circuit and magnetic recording head, and an optical head drive circuit and optical recording head can also utilized to record information on an optical recording strip.

The photographic film 42 is contained in a conventional film cartridge 44 and is wound on a take-up reel located in the camera body by a film motor 46. It should be noted that the magnetic head 38 is preferably fixed so that recording takes place when the film motor 46 winds the photographic film 42 onto the take-up reel. The magnetic head 38, however, can also be mounted on a transport mechanism such that the photographic film 42 remains stationary while the magnetic head 38 is transported across the magnetic strip 40 to record information.

The remote control unit 22 has its own processor unit 48 which is coupled to the IR transmitter 28, the remote operator interface 26, and a record/playback circuit 50. The record/playback circuit 50 is coupled to the microphone 24, a speaker 52 and an audio output jack 54. The record/playback circuit 50 includes a preamplifier, an automatic gain control circuit, filters, power output amplifiers, and a nonvolatile analog memory. A hardwired communication link 55 is preferably provided between the processor unit 48 of the remote control unit 22 and the main camera control processor 32 of the main camera body 10 when the remote control unit 22 is located within the slot 20.

In operation, the operator sets the main camera body 10 in a location sufficient to cover the intended subject and detaches the remote control unit 22 from the main camera body 10. The operator activates a shutter release button (S) on the remote operator interface 26 to send a shutter release command to the main camera body 10 via the processor unit 48 and IR transmitter 28. The main camera control processor 32 receives the shutter release command via the IR receiver 30 and activates the shutter mechanism of the camera to record an image on the picture frame area of the photographic film 42. At any time prior, during or after activating the shutter release button, the operator activates the record function button (R) on the remote operator interface 26 to send a record command signal to the processor unit 48. The processor unit 48, in response to the record command signal, activates the record/playback circuit 50 to record an audio sound segment that corresponds to the image recorded on the photographic film 42 using the output of the microphone 24. Each audio sound segment preferably includes a start and stop code unique to the audio sound segment, in order to insure that the audio sound segments can be identified on subsequent playback. In a manual mode of operation, the record/playback circuit 50 continues to record for as long as the record function button is depressed by the operator and the capacity of the memory within the record/playback circuit 50 is not exceeded. In an automatic mode of operation, the operator programs the desired duration of the audio segment into the processor unit 48 using controls provided in the user interface 26, and the processor unit 48 deactivates the record/playback circuit 50 once the programmed time period has expired.

If desired, the operator activates a playback button (P) on the user interface 26 to send a playback command to the processor unit 48. The processor unit 48, in response to the playback command, controls the record/playback circuit 50 to playback the recorded audio segment using the speaker 52. If the audio segment is acceptable, the operator activates a transmit button (T) on the user interface 26 which causes the control processor 48 to transmit a sound ID data to the main camera body 10 via the IR transmitter 28.

The sound ID data identifies the recorded audio segment as corresponding to the image captured on the photographic film by including the start and stop codes for the audio segment, and also indicates the duration of the audio segment. The main camera control processor 32 receives the sound ID data via the IR receiver 30, and activates the magnetic head drive circuit 36 to record the sound ID data on the magnetic strip 40 when the photographic film 42 is advanced to the next picture frame position by the film motor 46. The main camera control processor 32 preferably tracks the total amount of recording time used, and displays a message on the LCD 34 that indicates the amount of recording time remaining.

Figure 3:
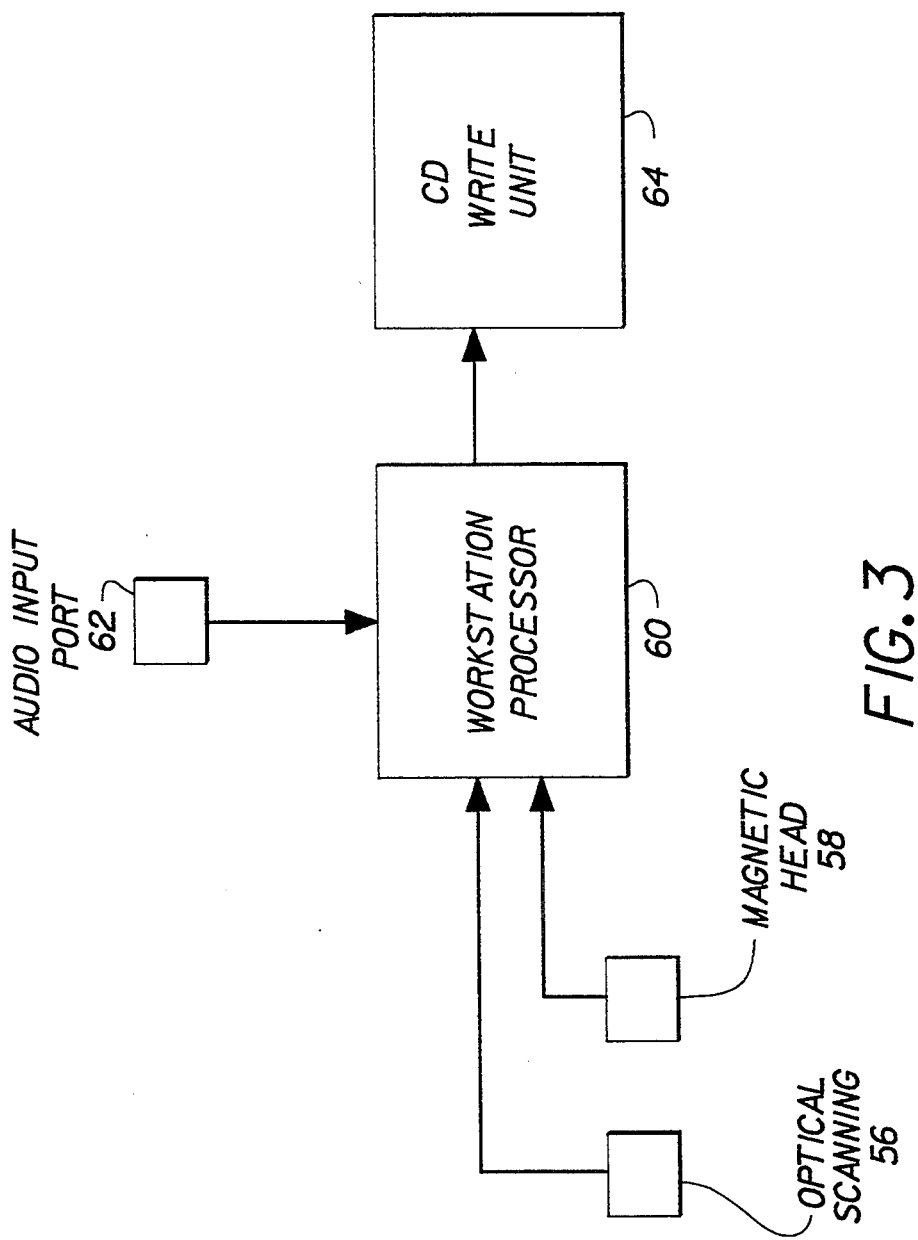
FIG. 3 is a block diagram of a workstation for converting image information and audio information into digital signals and recording the digital signals on a compact disc.

The processed film cartridge 44 is subsequently processed using conventional techniques, and is brought to a workstation of the type illustrated in FIG. 3 along with the remote control unit 22. The workstation includes an optical scanning head 56 for scanning the images contained on the photographic film 42 and a magnetic head 58 for reading the sound ID data words recorded on the magnetic strip 40 that are coupled to a workstation processor 60. The workstation also includes an audio input port 62 coupled to the workstation processor 60 that is connected to the audio jack 54 of the remote control unit 22. The recorded audio segments contained in the memory of the record/playback circuit 50 are downloaded to the workstation processor 60 via the audio jack 54 and audio input port 62. The workstation processor 60 digitizes the audio information signal from the audio input port 62 and the image information signal from the optical scanning head 56, and correlates the audio information to the corresponding image information using the sound ID data read by the magnetic head 58. The correlated digitized audio and image information is then supplied to a CD write unit 64 which writes the information onto a CD.

The incorporation of the microphone 24 into the remote control unit 22 also permits the remote control unit 22 to be placed near the subject to be photographed, so that the efficiency of the sound recording of the subject can be maximized. In such a case, the operator may wish to control the functions of the main camera body 10 and the recording function of the remote control unit 22 using the controls provided on the main body operator interface 16. The main camera body 10 is therefore preferably provided with an IR transmitter 64 and the remote control unit 22 is preferably provided with an IR receiver 66 (See FIG. 2), so that command signals can be sent from the main camera body 10 to the processor unit 48 of the remote control unit 22 to initiate sound recording in the manner described above.

The invention has been described with reference to certain preferred embodiments thereof. It will be understood, however, that modifications and variations are possible within the scope of the appended claims. For example, although the remote control unit can be mated with the main camera body in the illustrated embodiment, the remote control unit can also be a separate device that does not mate with the main camera body. In addition, any type of wireless communication can be used between the main camera body and the remote control unit in place of the preferred IR communication link. The playback feature can also be deleted to reduce the expense and complexity of the system. In such a case, the speaker 52 would be deleted and the record/playback circuit 50 would supply its output only to the jack 54.

Parts List

- 10 Main Camera Body
- 12 Lens Assembly
- 14 Flash Unit
- 16 Main Body Operator Interface
- 18 Shutter Button
- 20 Slot
- 22 Remote Control Unit
- 24 Microphone
- 26 Remote Operator Interface
- 28 IR Transmitter
- 30 IR Receiver
- 32 Main Camera Control Processor
- 34 LCD
- 36 Magnetic Head Drive Circuit
- 38 Magnetic Head
- 40 Magnetic Strip
- 42 Film
- 44 Film Cartridge
- 46 Film Motor
- 48 Processor Unit
- 50 Record/Playback Circuit
- 52 Speaker
- 54 Audio Output Jack
- 55 Hardwired communication link
- 56 Optical Scanning Head
- 58 Magnetic Head
- 60 Workstation Processor
- 62 Audio Input Port
- 64 CD Write Unit
- 66 IR Transmitter
- 68 IR Receiver

What is claimed is:

1. A photographic film camera system comprising:
   a main camera body including a main camera processor coupled to a main body operator interface, a recording head drive circuit and wireless communication receiver, and a recording head coupled to the recording head drive circuit; and
   a remote control unit including a processor unit coupled to an audio record/playback circuit, a remote operator interface and a wireless communication transmitter, and a microphone coupled to the audio record circuit;
   wherein the processor unit of the remote control unit controls the record/playback circuit to record an audio segment of a selected duration in response to a control signal received from the remote operator interface;
   wherein the processor unit of the remote control unit transmits sound identification data corresponding to the recorded audio segment to the main camera control processor via the wireless communication transmitter and receiver, and the main camera control processor controls the operation of the recording head drive circuit and recording head to record the sound identification data on a recording strip located on a photographic film; and
   wherein the sound identification data indexes the recorded audio segment to a corresponding exposed image frame on the photographic film.

2. A photographic camera system as claimed in claim 1, wherein the main camera body includes means for mating the remote control unit to the main camera body.

3. A photographic camera system as claimed in claim 1, wherein the wireless communication receiver is an infrared receiver and the wireless communication transmitter is an infrared transmitter.

4. A photographic camera system as claimed in claim 1, wherein the recording head drive circuit comprises a magnetic recording head drive circuit and the recording head comprises a magnetic recording head.

5. A photographic camera system as claimed in claim 1, wherein the main camera body further comprises a wireless communication transmitter coupled to the main camera processor and the remote control unit further comprises a wireless communication receiver coupled to the processor unit, and wherein the processor unit of the remote control unit controls the record/playback circuit to record an audio segment of a selected duration in response to a control signal received from the main body control operator interface.

6. A photographic camera system as claimed in claim 1, wherein the remote control unit further comprises a speaker coupled to the audio record/playback circuit.

7. A photographic camera system comprising: a remote control unit and a main camera body; wherein said remote control unit includes means for recording at least one audio segment, and means for transmitting sound identification data corresponding to the audio segment to the main camera body; wherein said main camera body includes means for receiving the sound identification data, and means for recording the sound identification data on a recording strip located on a photographic film; and wherein the sound identification data indexes the recorded audio segment to a corresponding exposed image frame on the photographic film.

8. A photographic camera system as claimed in claim 7, wherein the main camera body further comprises means for transmitting control signals to the remote control unit, and wherein the remote control unit further comprises means for receiving the control signals transmitted by the main camera body.

9. A photographic camera system as claimed in claim 7, wherein the remote control unit further comprises means for audibly reproducing the audio segment.

* * * * *